United States Patent
Okamoto

(10) Patent No.: US 9,578,726 B2
(45) Date of Patent: Feb. 21, 2017

(54) DISCHARGE LAMP LIGHTING APPARATUS AND PROJECTOR

(71) Applicant: USHIO DENKI KABUSHIKI KAISHA, Tokyo (JP)

(72) Inventor: Masashi Okamoto, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 690 days.

(21) Appl. No.: 13/672,149

(22) Filed: Nov. 8, 2012

(65) Prior Publication Data

US 2013/0120717 A1    May 16, 2013

(30) Foreign Application Priority Data

Nov. 11, 2011   (JP) .................................. 2011-247426

(51) Int. Cl.
*H05B 41/392* (2006.01)
*G03B 21/20* (2006.01)
(Continued)

(52) U.S. Cl.
CPC ............... *H05B 41/16* (2013.01); *G03B 21/14* (2013.01); *H05B 41/2928* (2013.01);
(Continued)

(58) Field of Classification Search
CPC .................... H05B 41/2928; H05B 41/2888
(Continued)

(56) References Cited

U.S. PATENT DOCUMENTS

2005/0151937 A1* 7/2005 Sugitani ........................ 353/85
2006/0197473 A1* 9/2006 Fukuwa ....................... 315/308
(Continued)

FOREIGN PATENT DOCUMENTS

JP    02-119005 A    5/1990
JP    08-505031 A    5/1996
(Continued)

OTHER PUBLICATIONS

Office Action issued in Japanese Application No. 2011-247426, dated Jun. 23, 2015.

*Primary Examiner* — Alexander H Taningco
*Assistant Examiner* — Renan Luque
(74) *Attorney, Agent, or Firm* — Michael Best & Friedrich LLP

(57) ABSTRACT

A discharge lamp lighting apparatus for lighting a discharge lamp in which an electric discharge medium, which contains xenon, is enclosed in an electric discharge container, and a pair of cathode electrode and anode electrode for main discharge is arranged to face each other, comprises a starter for generating dielectric breakdown in the electric discharge container of a discharge lamp, and a power supply circuit for supplying discharge current to the discharge lamp, wherein the power supply circuit has an output current modulation circuit for modulating the magnitude of current passed through the discharge lamp in at least a lighting steady state, according to a modulation signal, and wherein the output current modulation circuit controls speed of change so as to be 2.6 A or less per millisecond in case the magnitude of the lamp current per square millimeter in a cross section of the cathode electrode decreases.

19 Claims, 10 Drawing Sheets

(51) Int. Cl.
*H05B 41/16* (2006.01)
*G03B 21/14* (2006.01)
*H05B 41/292* (2006.01)

(52) U.S. Cl.
CPC ..... *H05B 41/3928* (2013.01); *G03B 21/2053* (2013.01); *Y02B 20/202* (2013.01)

(58) Field of Classification Search
USPC ... 315/128, 291, 200, 224, 308, 287, 84, 85; 353/85
See application file for complete search history.

(56) References Cited

U.S. PATENT DOCUMENTS

| | | | |
|---|---|---|---|
| 2007/0236157 A1* | 10/2007 | Okamoto | 315/291 |
| 2010/0097003 A1* | 4/2010 | Toda | H05B 41/2887 315/224 |
| 2011/0140625 A1* | 6/2011 | Van Casteren | 315/246 |

FOREIGN PATENT DOCUMENTS

| | | |
|---|---|---|
| JP | 09-161727 A | 6/1997 |
| JP | 2007-280822 A | 10/2007 |
| WO | WO-95/11572 A1 | 4/1995 |
| WO | WO-2010/020937 A1 | 2/2010 |

* cited by examiner

DISCHARGE LAMP LIGHTING APPARATUS AND PROJECTOR

CROSS-REFERENCES TO RELATED APPLICATION

This application claims priority from Japanese Patent Application Serial No. 2011-247426 filed Nov. 11, 2011, the contents of which are incorporated herein by reference in its entirety.

TECHNICAL FIELD

The present invention relates to a discharge lamp lighting apparatus, for example, a short arc high intensity discharge lamp, such as a xenon discharge lamp, which is used in an optical device such as a projector, and has an electric discharge medium containing xenon as a main component.

BACKGROUND

For example, in a projector for image display such as a liquid crystal projector or a DLP™ projector, a high intensity discharge lamp (HID lamp) is used. In some types of such projectors, light is separated into three primary colors of red (R), green (G), and blue (B) by a dichroic prism etc., so that a space modulation element provided for each color generates an image of each of the three primary colors, and the optical paths thereof are combined by a dichroic prism etc., thereby displaying a color image. In another known type of projector, a filter having three primary color areas (R, G, and B) is rotated, and light emitted from a light source is passed through this filter, thereby sequentially generating light rays of the three primary colors, and then the spatial modulation elements are controlled in synchronization with the generated light rays so as to sequentially generate an image of each of the three primary colors in a time dividing manner, thereby displaying a color image.

The high intensity discharge lamp used as a light source for such a projector may be, for example, a high pressure mercury lamp, a metal halide lamp, or a xenon discharge lamp etc. However, a xenon discharge lamp, in which the emission spectrum thereof is similar to sunlight and large electric power can be comparatively easily realized, is used in a dedicated manner for a high-definition image, to which a greater importance is attached to the color reproduction nature, or for a large area screen image in a movie theater etc.

An example of a schematic structure of such a xenon discharge lamp is shown in FIG. 12. In an outer enclosure (10), which surrounds an electrical discharge space (Es) containing xenon gas as a main component, and which is made from a heat-resistant and high transparent material such as silica glass etc., a cathode electrode (E1) and an anode electrode (E2), which are made from a heat-resistant conductive material such as tungsten etc., are arranged so as to face each other, wherein arc discharge is generated between both electrodes. During lighting, electrons, which are emitted from the cathode electrode (E1) and reach the anode electrode (E2) release kinetic energy as heat, so that the anode electrode (E2) generates heat remarkably. Therefore, the thickness and length of the anode electrode (E2) need to be large comparing with those of the cathode electrode (E1), in order to raise the heat dissipation efficiency. The cathode electrode (E1) and the anode electrode (E2) are respectively connected to cathode and anode side caps (03, 05) through metallic foils (02, 04) made of molybdenum, for supply of electricity. In the case of the lamp of FIG. 12, in order to efficiently use light emitted from the arc discharge space, a concave mirror, which has a paraboloidal face or elliptical face shape, is provided near the lamp, and the light is guided to an optical system of a following stage such as a light tunnel.

On the other hand, FIG. 13 shows an example of a schematic structure of a xenon discharge lamp, wherein an outer enclosure (70) surrounding an electrical discharge space (Es) serves as the above-described concave mirror, and such a xenon discharge lamp is proposed in Japanese Patent Application Publication No. H09-161727. A cathode electrode (E1) is connected to a cap (64) for a cathode through electric conduction supporters (61, 62, 63) made from high heat-resistant and conductive material such as a molybdenum sheet etc., and an anode electrode (E2) is directly connected to a cap (65) for an anode. Although the outer enclosure (70) is made from high heat-resistant ceramic material such as alumina etc. since no transparency is required therefor, a light extraction window (71) is made from the transparent material with high heat resistance and high mechanical strength such as sapphire etc. Metal covers (66, 67) for airtightness and protection are provided on connecting faces of the outer enclosure (70) between the cap (64) for a cathode and the cap for (65) an anode. Electric supply connections with the cap (64) for a cathode and the cap (65) for an anode are made through a conductive radiation fins.

In a discharge lamp lighting apparatus for lighting the above-mentioned xenon discharge lamp, first, high voltage is impressed to the lamp by a starter in a state where voltage called no-load open voltage is impressed to the lamp when it is started, so that dielectric breakdown is generated in the electrical discharge space, and inrush current having a suitable peak value is supplied thereto, in order that it shifts to arc discharge for starting, whereby an operation is finally performed so that stable steady lighting may be realized. Usually, such a discharge lamp lighting apparatus has a converter which adjusts an output of an input power supply for lamp discharge voltage so that target lamp current, which is required in order to realize predetermined power to be applied to the lamp, can be outputted. Moreover, the lamp voltage, i.e., output voltage of the converter, may be detected, and target lamp current is determined based on this information, by, for example, a quotient value which can be obtained by dividing the target power by the detected voltage.

By the way, it is desirable that the light source lamp have a long life span in not only the projector described above, but also all uses. However, in such a xenon discharge lamp, temperature management during lighting is important for the extension of life span. Although it may seem to be advantageous with respect to extension of life span for the temperature of each part of the lamp to be low, this is not actually the case—the life span of some parts is actually shortened if their temperature is too low.

The life span in continuous lighting conditions of a xenon discharge lamp that is designed so that the temperature of the cathode electrode may become low during lighting may become long since there is suppressing effect in consumption of the cathode due to electric discharge. However, in such a case, a blackening phenomenon of a lamp bulb occurs at start-up time of the lamp, whereby there is a problem that a life span thereof becomes shorter than a life span of those which are designed so that the temperature of a cathode electrode may not become too low. This can be easily checked by performing flashing-lighting. Therefore, in the past, a lamp has been designed so as to optimize the temperature of the cathode electrode so that the life span under the operating condition of flashing-lighting may become the longest.

On the other hand, in order to make color reproduction performance of a display image high, the spectrum distribution of the light source lamp and adjustment of a conversion form to color sequential light flux using the above-mentioned dynamic color filter are important. In the case of the above-mentioned color wheel, when the angle distribution of each color of R, G, and B (in some case, additionally W, i.e. white), that is, the amount of time that each color transmits per one rotation, is set up according to the spectrum of the lamp, it is possible to improve color reproduction performance or to make improvements to obtain a desired color reproduction performance.

For example, when a B component runs short, it is effective to make an area, where the B component passes through, large, that is, to make the amount of time during which the B component passes through the filter, longer than that of other colors. However, when an improvement is made to obtain desired color reproduction performance by such a method in a DLP type projector, there is a problem that it becomes difficult to perform fine control of gradation of a pixel in a color component in which the rate of transmission time is reduced, since the luminance of each color of every pixel of a display image in a DLP type projector is controlled based on a duty cycle ratio in an operation of each pixel of a spatial modulation element. Moreover, when the color reproduction property is dynamically changed, the fine control of gradation will be impaired.

In order to solve such a problem, for example, in Japanese Patent Application Publication No. 08-505031, it is proposed that in an image projection apparatus, a light source drive control unit is provided to change the output power of a light source in synchronization with the color of the optical beam given by the output of a color change unit, whereby light source intensity modulation is performed.

Moreover, in Japanese Patent Application Publication No. 02-119005, a light device, which adjusts the light emission light intensity of a light source according to the color of a filter region in synchronization with the rotation of a rotation color wheel, is proposed. In addition, although this literature is not intended for a projector (rather, an endoscope apparatus is targeted), the above-described case does not differ from the literature in terms of performing light source intensity modulation. Therefore, the situations thereof are the same as each other with respect to a problem, which is described below and which is caused by the light source intensity modulation.

Thus, in order to solve the above-mentioned problem of increasing color reproduction performance, it is known that it is useful to perform light source intensity modulation synchronized with the conversion operation to the color sequential light flux, which uses a dynamic colored filter. However, in the case of a xenon discharge lamp, which is especially designed so that the temperature of a cathode electrode may become low, when lighting is performed by the discharge lamp lighting apparatus in which output current modulation is performed for such light source intensity modulation, there is also a problem that blackening of a lamp bulb tends to occur in addition to the above-mentioned blackening phenomenon.

For solutions to this problem, Japanese Patent Application Publication No. 2007-280822 discloses "a discharge lamp lighting apparatus (Ex) for lighting the discharge lamp (Ld) in which an electric discharge medium, which contains xenon, is enclosed in an electric discharge container, a pair of cathode electrode (E1) and an anode electrode (E2) for main discharge is arranged to face each other, and at least the cathode electrode (E1) contains electron emissive material, wherein the discharge lamp lighting apparatus (Ex) has a starter (Us) for generating dielectric breakdown in the electric discharge container of the discharge lamp (Ld) by generating high voltage at start-up time, and a power supply circuit (Ux) for supplying discharge current to the discharge lamp (Ld), wherein the power supply circuit (Ux) has an output current modulation circuit (Um) for modulating the magnitude of current passed through the discharge lamp (Ld) in at least a lighting steady state, according to a modulation signal (Sm), and wherein while the output current modulation circuit (Um) controls speed of change at which the magnitude of lamp current per square millimeter in a cross section of the cathode electrode (E1) increases, so as to 3.9 A or less per millisecond, average current in the lighting steady state is set in the power supply circuit (Ux), to a value in a range where a variant part is formed at a tip part of the cathode electrode (E1).

That is, after specifying the speed of change at which the magnitude of lamp current increases by the output current modulation, the average current in the lighting steady state is set to a value in the range where the variant part is formed in the tip part of the cathode electrode (E1). However, it turns out that when lighting, for which intense output current modulation for light source intensity modulation is performed, continues in such a discharge lamp lighting apparatus, there is electric discharge instability, which tends to occur when output current modulation is eased after the intense modulation. That is, it turns out that when the lighting state in which rectangle pulsed current is periodically superimposed to a certain level of lamp current, continues, and then superposition of the pulsed current is stopped or the magnitude of the pulsed current to be superimposed is decreased, electric discharge instability occurs sometimes.

An example of this electric discharge instability is given in a concrete application: after lamp current is increased by performing output current modulation of, for example, a specified color segment(s) of one or more colors in the color wheel, in synchronization with the timing at which a beam from a discharge lamp passes therethrough, so that an operation in which the specific color(s) is reinforced and compensated for projection in a projector image, when the increased lamp current is reduced by stopping or decreasing output current modulation in order to project a dark image like a night view, electric discharge instability may occur so that a flicker sometimes appears in the projector image. Although this flicker usually disappears gradually in tens of seconds to several minutes by continuing the lighting under that lighting condition, it is very offensive to the eyes of the viewer of an image, so that the improvement thereof is demanded.

SUMMARY

The electric discharge instability observed in the related art discussed above is thought to be caused by fine protrusions that are formed on a tip of the cathode electrode (E1) of the discharge lamp (Ld) in areas where an arc spot existed at the time of electric discharge. The diameter of a typical size of the fine protrusions was observed to be 20-60 micrometers, and the height thereof was 20-50 micrometers.

Although an electric discharge phenomenon generally does not necessarily occur along the shortest course between the cathode and the anode, electric discharge from a part near the anode, such as a fine protrusion part, tends to be more preferred than discharge from other parts when the temperature of the cathode reaches a level so as to be sufficient for thermoelectronic emission. However, since there are two or more fine protrusions formed in an arc spot in in the lamp of the related art, it is thought that competition of the actions, which draw superior electric discharge between fine protrusions, takes place, whereby electric discharge instability occurs.

An exemplary illustration of the present invention may solve the aforementioned problems by providing a discharge lamp lighting apparatus and a projector, capable of avoiding electric discharge instability, which tends to occur, as described above, when lighting in which intense output current modulation is performed for a light source intensity modulation, and then the output current modulation is lowered, even in the case where a xenon discharge lamp—specifically a xenon discharge lamp that is designed so that the temperature of a cathode electrode may become low—is lighted.

An exemplary illustration of the discharge lamp lighting apparatus for lighting a discharge lamp in which an electric discharge medium, which contains xenon, is enclosed in an electric discharge container, and a cathode electrode and anode electrode for main discharge are arranged to face each other, may comprise: a starter for generating dielectric breakdown in the electric discharge container of the discharge lamp, by generating a high voltage at start-up time, and a power supply circuit for supplying discharge current to the discharge lamp, wherein the power supply circuit has an output current modulation circuit for modulating the magnitude of current passed through the discharge lamp in at least a lighting steady state, according to a modulation signal, and wherein the output current modulation circuit controls a speed at which the magnitude of the discharge current per square millimeter in a cross section of the cathode electrode decreases so as to be 2.6 A or less per millisecond.

The output current modulation circuit may limit the speed at which the magnitude of the discharge current per square millimeter in a cross section of the cathode electrode decreases to a speed at which undershoot of lamp voltage does not occur.

The output current modulation circuit may control the speed at which the magnitude of the discharge current per square millimeter in a cross section of the cathode electrode increases so as to be 3.0 A per millisecond or less.

The output current modulation circuit may limit the speed at which the magnitude of the discharge current per square millimeter in a cross section of the cathode electrode increases to a speed at which overshoot of the lamp voltage does not occur.

Since the speed of change of lamp current becomes slow when lighting the exemplary illustration of the xenon discharge lamp, which is designed so the temperature of a cathode electrode may become low, formation of two or more fine protrusions can be prevented in the inside or the circumference part of an arc spot at the tip of the cathode electrode at the time of electric discharge, so that it is possible to avoid the electric discharge instability which tends to occur when lighting in which the intense output current modulation for light source intensity modulation is performed, is continued, and then output current modulation is weakened.

BRIEF DESCRIPTION OF THE DRAWING

Other features and advantages of the present discharge lamp lighting apparatus and projector will be apparent from the ensuing description, taken in conjunction with the accompanying drawings, in which.

DESCRIPTION

Figure 1:
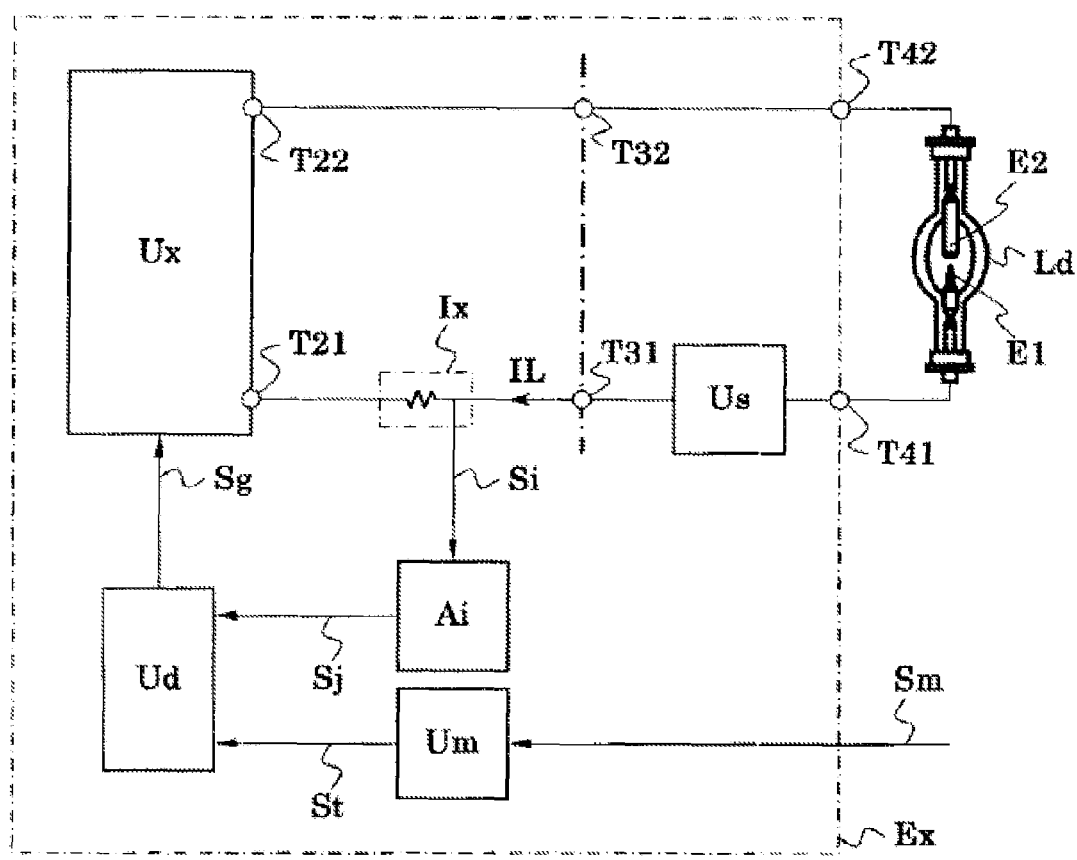
FIG. 1 is a schematic block diagram showing a form of a discharge lamp lighting apparatus according to the present invention.

One means of overcoming the above-described electric discharge instability, even in the case where lighting with intense output current modulation is performed continuously, may be to prevent formation of two or more fine protrusions in the inside or circumference part of the arc spot at the tip of the cathode electrode (E1) at time of the electric discharge, as described below.

The inventors of the present invention conducted a simulated and actual test, in which various values of a current increasing speed and current decreasing speed of the pulse part to be superimposed according to the current modulation technique where applied. The current decreasing speed per square millimeter in a cross section of the cathode electrode was varied under a condition where the current increasing speed per square millimeter in a cross section of the cathode electrode is 3.9 A per millisecond. It turned out that electric discharge insecurity occurred and two or more fine protrusions were formed when the current decreasing speed was 3.9 A per millisecond. Electric discharge insecurity did not occur and some fine protrusions were formed when the current decreasing speed was 2.6 A per millisecond. Electric discharge insecurity did not occur and less than two fine protrusions were formed when the current decreasing speed was 1.6 A per millisecond.

Although the reason why formation of two or more fine protrusions is suppressed by restricting the current decreasing speed of a pulse part to be superimposed is not certain, it is considered as set forth below. An area of an arc spot may be in general considered to be proportional to electric discharge current, so that when the current decreasing speed of the pulse part to be superimposed is too large the current density decreases as a whole while the area of the arc spot remains constant, resulting in unevenness of the current density in the arc spot during the period in which the pulse is not superimposed. This results in unevenness of temperature distribution. Therefore, when pulsed current is superimposed thereon next time, current flows selectively into the part at which temperature is high, so that the cathode material is melted locally. The melted area rises due to surface tension, whereby two or more fine protrusions are formed since there is unevenness of temperature distribution as described above.

On the contrary, if the current decreasing speed of the pulse part to be superimposed is low, it is presumed that the area of an arc spot gradually contracts in advance of the decrease of current. Thus, during a following period in which the pulse is not superimposed and current is at a low level, the area of the arc spot is automatically realized so that the unevenness of the current density in the arc spot does not occur, and the unevenness of temperature distribution is suppressed. Therefore, when pulsed current is superimposed thereon next time, parts where the cathode material have been locally melted by selective current flow are not easily formed and fine protrusions are formed as readily.

Given this perspective, it is possible to explain the reason why the electric discharge instability due to the formation of two or more fine protrusions occurs especially in a xenon discharge lamp that is designed so that the temperature of the cathode electrode during lighting may become low. That is, as described above, when the current decreasing speed of pulse part to be superimposed is too high, the unevenness of the current density in an arc spot arises in a period when pulse is not superimposed thereon and current is at a low level resulting in unevenness of the temperature distribution, and since at the same time, heat is quickly released from the cathode electrode tip part (since the xenon discharge lamp is specially designed so that the temperature of the cathode electrode during lighting may become low), the unevenness of temperature distribution is exacerbated, so that two or more fine protrusions are easily generated.

Figure 11:
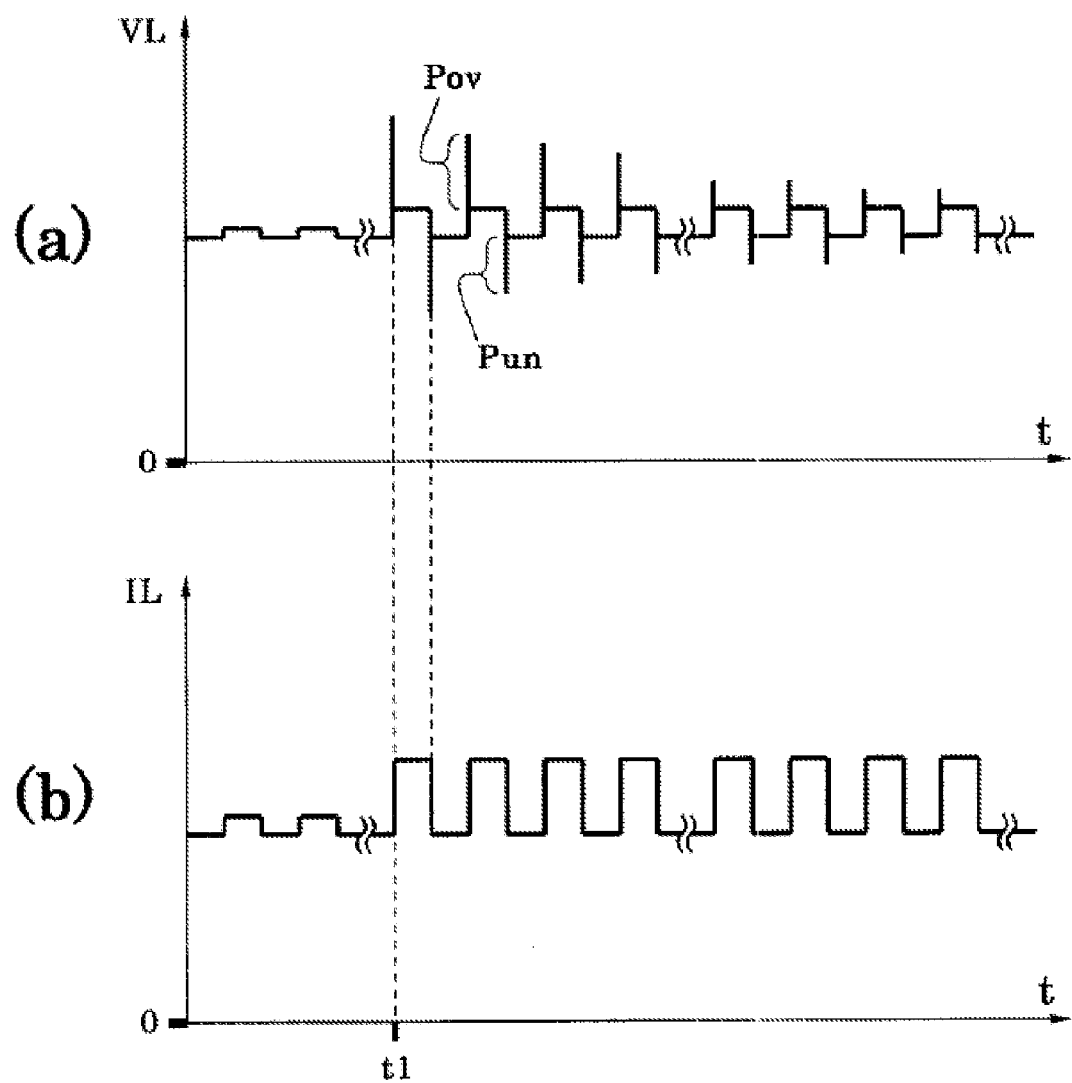
FIG. 11 is a diagram showing one form of an operation of a discharge lamp lighting apparatus according to an embodiment of the present invention.
Figure 12:
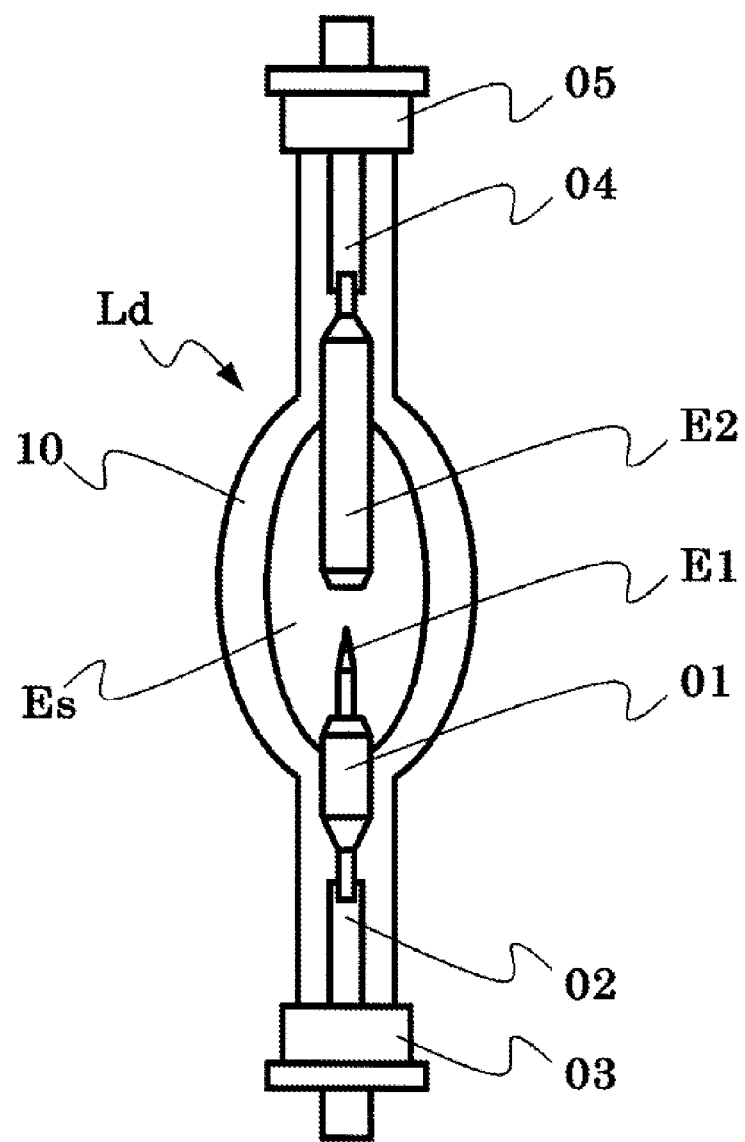
FIG. 12 is a conceptual diagram for explaining the structure of a kind of lamp concerning a discharge lamp lighting apparatus according to the present invention.
Figure 13B:
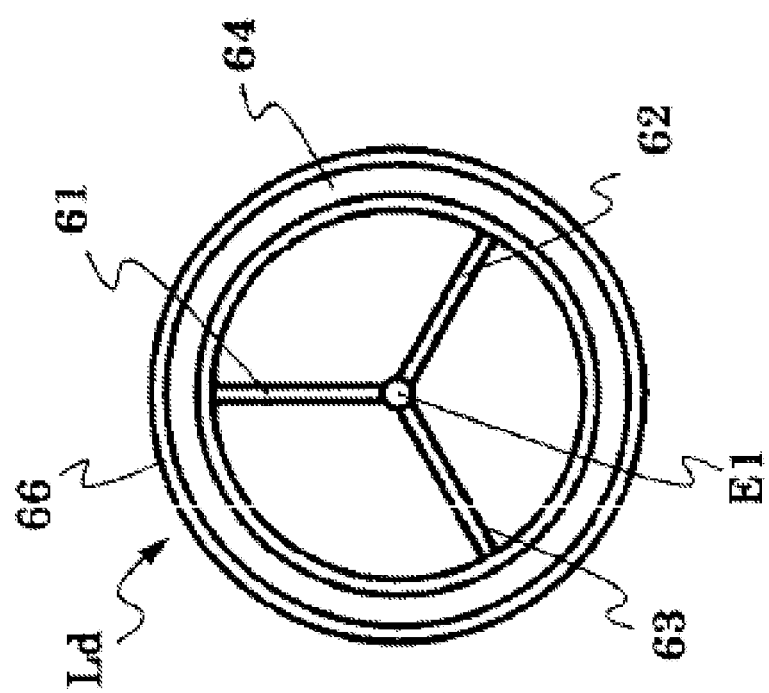
FIGS. 13A and 13B are conceptual diagrams for explaining the structure of a kind of lamp concerning a discharge lamp lighting apparatus according to the present invention.
Figure 13A:
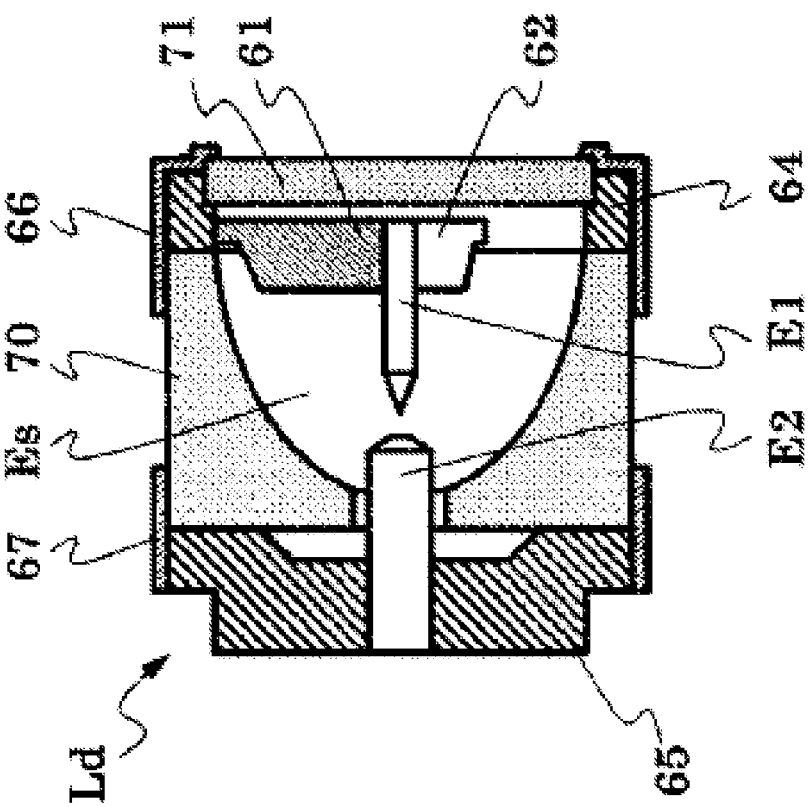

FIG. 11 schematically shows a state where the waveforms of the voltage and current of the discharge lamp (Ld) are observed by using, for example, an oscilloscope in case output current modulation is performed, wherein (a) shows a waveform of lamp voltage (VL), and (b) shows waveform of lamp current (IL), and wherein pulsed current to be superimposed is changed into a large value after time (t1), in a state where the pulsed current of a small value is periodically superimposed on a reference level of the lamp current.

As shown in FIG. 11, in the waveform of the lamp voltage (VL), when the magnitude of the lamp current in pulse part to be superimposed increases, an overshoot (Pov) occurs, and when the magnitude of the lamp current in pulse part to be superimposed decreases, an undershoot (Pun) occurs. However, the overshoot (Pov) and the undershoot (Pun) decrease with passage of time from the time (t1). It was found, however, that the undershoot (Pun) of the lamp voltage (VL) does not occur even immediately after the time (t1) under the conditions where electric discharge instability did not occur. Conversely, if the current decreasing speed is not suitable, although the reason why the undershoot (Pun) of the lamp voltage (VL) occurs is not certain, it is presumed that if the current decreasing speed of pulse part to be superimposed is too high, in the process where the current decreases and when the current stops decreasing, an area of the arc spot where the thermoelectronic emission is possible at that time becomes excessive compared with an area that matches the magnitude of the whole current, so that the electric conduction rate of plasma becomes unusually high temporarily, so that the undershoot (Pun) of the lamp voltage (VL) occurs.

On the other hand, it turned out that when the current increasing speed per square millimeter in a cross sectional area of the cathode electrode was varied under conditions where the current decreasing speed per square millimeter in a cross sectional area of the cathode electrode was held constant at 2.6 A per millisecond, electric discharge instability does not occur and two or more fine protrusions are not formed when the current increasing speed per square millimeter is 3.0 A per millisecond.

Thus, although the reason is not certain why formation of two or more fine protrusions is suppressed by restricting the current increasing speed of pulse part to be superimposed in this way, it is presumed that if the current increasing speed of the pulse part to be superimposed is low, when the pulsed current is superimposed thereon, current selectively flows into part where the temperature is high so that the cathode material melts locally, resulting in the formation of fine protrusions.

Moreover, in the result of the simulated and actual test in which the current increasing speed was varied, it turned out that under condition where electric discharge instability and two or more fine protrusions did not occur, the overshoot (Pov) of the lamp voltage (VL) showed in FIG. 11 did not occur immediately after the time (t1).

Conversely although the reason why the overshoot (Pov) of the lamp voltage (VL) occurs when this speed is not suitable, is not certain, it is presumed that if the current increasing speed of pulse part to be superimposed is too high, in the process in which current increases, and when current stops increasing, an area of the arc spot where the thermoelectronic emission is possible at that time becomes less than an area that matches the magnitude of the whole current, whereby it is forced to cover current by generating glow discharge with high voltage even partially, so that the overshoot (Pov) of the lamp voltage (VL) occurs.

Description of an embodiment of the present invention will be given below, referring to FIG. 1, which is a schematic block diagram showing an exemplary illustration of a discharge lamp lighting apparatus. In FIG. 1, a starter (Us) for generating dielectric breakdown at start-up time of a discharge lamp (Ld) is in series connected to the discharge lamp (Ld), and a power supply circuit (Ux) for supplying discharge current is connected to them. In addition, since the starter (Us) is required to generate high voltage of approximately 30 kV, so that it tends to generate a radiation noise, it is sometimes desirable that a discharge lamp lighting apparatus (Ex) be configured so that a portion on a lamp side with respect to nodes (T31, T32) may be separated from the other portions.

A lamp current detection signal (Si) obtained from a lamp current detection unit (Ix), which is provided for detecting current flowing through the discharge lamp (Ld), is converted into a lamp current correlation signal (Sj) by a lamp current detection signal converting circuit (Ai) such as a buffer, an amplifier etc., which is provided for converting this signal so as to match a signal level, which is required for a downstream side circuit. On the other hand, a lamp current target signal (St), which indicates the magnitude of target value of the current to be passed through the discharge lamp (Ld), is generated in an output current modulation circuit (Um). The lamp current correlation signal (Sj) and the lamp current target signal (St) are inputted into a power supply capacity control circuit (Ud) for controlling the power supply circuit (Ux) in a feedback manner, so that the difference between both signals may become small. The power supply capacity control circuit (Ud) generates a gate driving signal (Sg), which is modulated, for example, by changing duty cycle ratio, and inputs it to the power supply circuit (Ux).

A modulation signal (Sm) is inputted into the output current modulation circuit (Um), whereby a modulation of the lamp current target signal (St) is performed. Here, the modulation signal (Sm) may be a binary logic signal, wherein the output current modulation circuit (Um) indicates whether or not a modulation for raising the lamp current target signal (St) is performed based on the true or false state of the modulation signal (Sm), or the modulation signal (Sm) may be an analog signal, wherein the output current modulation circuit (Um) performs the modulation for raising the lamp current target signal (St) by the amount which is continuously correlated with the magnitude of the modulation signal (Sm). Moreover, the modulation signal (Sm) may be multi-bit digital numerical data, wherein the output current modulation circuit (Um) performs the modulation for raising the lamp current target signal (St) by the amount which is correlated with the magnitude of the numerical data value of the modulation signal (Sm). The output current modulation circuit (Um) limits and outputs the speed of change of the lamp current target signal (St) so that the speed of a decrease of lamp current per square millimeter in a cross sectional area of the cathode electrode (E1) may be 2.6 A or less per millisecond.

In order to realize this function in a simple way, a structure for adjusting the speed of response of the output current modulation circuit (Um) itself so as to be slow may be provided. In such case, regardless of the speed of change of the lamp current target signal (St), the speed of change of the modulation signal (Sm) is limited and outputted. When the modulation signal (Sm) is a binary logic signal, such a configuration may be included in the output current modulation circuit (Um). However, since the speed of change in the case the magnitude of lamp current increases, is affected by the speed of response of the power supply circuit (Ux) or the speed of response of the power supply capacity control circuit (Ud), when the speed of response of the output current modulation circuit (Um) is adjusted, the amount of adjustment is preferably experimentally determined such that the speed of a decrease in the magnitude of the lamp current per square millimeter in a cross sectional area of the cathode electrode (E1) may be 2.6 A or less per millisecond and/or the undershoot (Pun) may not occur in the lamp voltage (VL), and such that the speed of an increase in the magnitude of the lamp current per square millimeter in a cross sectional area of the cathode electrode (E1) may be 3.0 A or less per millisecond and/or the overshoot (Pov) may not occur in the lamp voltage (VL).

In the case where the modulation signal (Sm) is an analog signal, and the modulation is performed in the output current modulation circuit (Um) so that the lamp current target signal (St) may be raised by an amount that is continuously correlated with the magnitude of the modulation signal (Sm), or in the case where the modulation signal (Sm) is a multi-bit digital numerical data, which is realized by two or more signal wires, and where the modulation is performed in the output current modulation circuit (Um) so that the lamp current target signal (St) may be raised by an amount that is correlated with the magnitude of the modulation signal (Sm), similarly, the speed of response of the output current modulation circuit (Um) may be adjusted so as to be slow. Or, alternatively, the modulation signal (Sm) itself may be generated as a signal in which speed of change is limited, which results in the speed of change of the lamp current target signal (St) output by the output current modulation circuit (Um) being limited. The adjustment to the current modulation circuit (Um) or the limitation of the modulation signal (Sm) should be set such that the speed of a decrease in the magnitude of the lamp current per square millimeter in a cross sectional area of the cathode electrode (E1) may be 2.6 A or less per millisecond and/or the undershoot (Pun) may not occur in the lamp voltage (VL), and such that the speed of an increase in the magnitude of the lamp current per square millimeter in a cross sectional area of the cathode electrode (E1) may be 3.0 A or less per millisecond and/or the overshoot (Pov) may not occur in the lamp voltage (VL).

Figure 2:
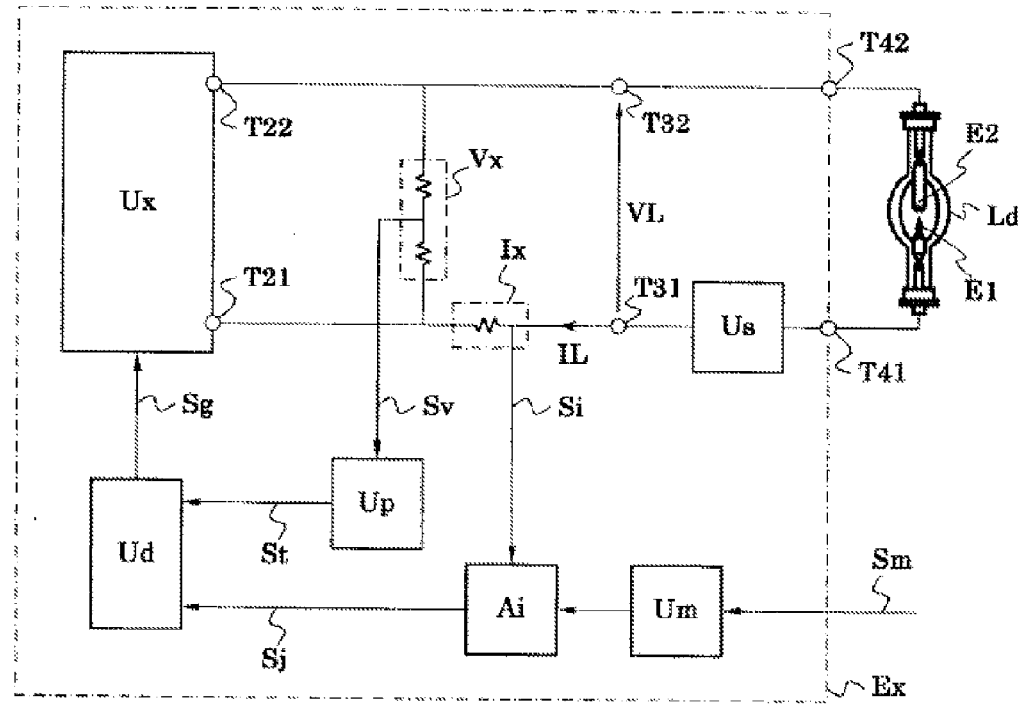
FIG. 2 is a schematic block diagram showing one form of a discharge lamp lighting apparatus according to the present invention.

By the above-described configuration, as shown in FIG. 1, it is possible to offer the discharge lamp lighting apparatus, in which it is possible to avoid the electric discharge instability that tends to occur when intense output current modulation is performed for a period then the output current modulation is eased, because formation of the fine protrusions is prevented since the speed of change of lamp current becomes slow when the xenon discharge lamp shown in FIG. 1, which is designed so that the temperature of a cathode electrode may become low, is lighted Next, description of an embodiment will be given below, referring to FIG. 2, which is a schematic block diagram showing an exemplary illustration of a discharge lamp lighting apparatus. The discharge lamp lighting apparatus previously described referring to FIG. 1, is based on constant current control of lamp current, and performs output current modulation on the basis of the constant current control. Instead of that, it may be based on constant electric power control of the lamp electric power.

In the discharge lamp lighting apparatus shown in FIG. 2, a lamp voltage detection unit (Vx) for detecting lamp voltage (VL) and generating a lamp voltage detection signal (Sv), is provided, and a lamp current target signal generation circuit (Up) receives the lamp voltage detection signal (Sv), and generates the lamp current target signal (St) for realizing a predetermined lamp electric power target value. Here, the lamp current target signal generation circuit (Up) generates the lamp current target signal (St) by, for example, dividing the predetermined lamp electric power target value by a value of the lamp voltage detection signal (Sv). For example, in the circuit structure, a microprocessor can be used to configure the lamp current target signal generation circuit (Up), wherein division calculation is performed based on a value obtained by an AD conversion of the lamp voltage detection signal (Sv), and the lamp current target signal (St) may be generated by a DA conversion.

On the other hand, the output current modulation circuit (Um), in which the modulation signal (Sm) is inputted, is configured so as to act on a lamp current detection signal converting circuit (Ai), for converting the lamp current detection signal (Si) from the lamp current detection unit (Ix) which is provided to detect the current flowing into the discharge lamp (Ld), and the lamp current detection signal converting circuit (Ai) is preferably configured so as to convert the lamp current detection signal (Si) to the lamp current correlation signal (Sj) which is modulated according to the modulation signal (Sm). Since the modulation signal (Sm) is not inputted into the lamp current target signal generation circuit (Up), and since in case of a xenon discharge lamp, a change of lamp voltage (VL) is small even if the lamp current (IL) changes, the lamp current target signal generation circuit (Up) continues an operation, in which the lamp current target signal (St) for realizing the predetermined lamp electric power target value is generated, regardless of the state of the modulation signal (Sm). However, since the lamp current correlation signal (Sj) modulated according to the modulation signal (Sm) is inputted into the power supply capacity control circuit (Ud), as a result, the power supply circuit (Ux) is controlled in a feedback manner under the influence of the modulation based on the modulation signal (Sm).

However, in order to avoid disturbance of the electric power control due to small change of the lamp voltage (VL) when the lamp current (IL) changes, it is good to limit an acquisition timing of the lamp voltage (VL) to a timing when it is in a specific modulation state. Here, the specific modulation state means that in the case where the modulation signal (Sm) is a binary logic signal, for example, the signal is in a state of true. Or it means that, in the case where the modulation signal (Sm) is an analog signal or multi-bit digital numerical data, for example, it is a state where a value thereof falls within a specific range etc. Although there may be concern that electric power control cannot be carried out normally since the frequency of occurrence of such a specific modulation state is low, and the frequency of lamp voltage acquisition is too high. However, since in lamp voltage at time of stable lighting after shifting to arc discharge, there is only very slow change accompanying advance of life thereof which attributes to electrode consumption unless output current modulation is performed, there is no problem even if the frequency of lamp voltage acquisition is low.

Figure 3:
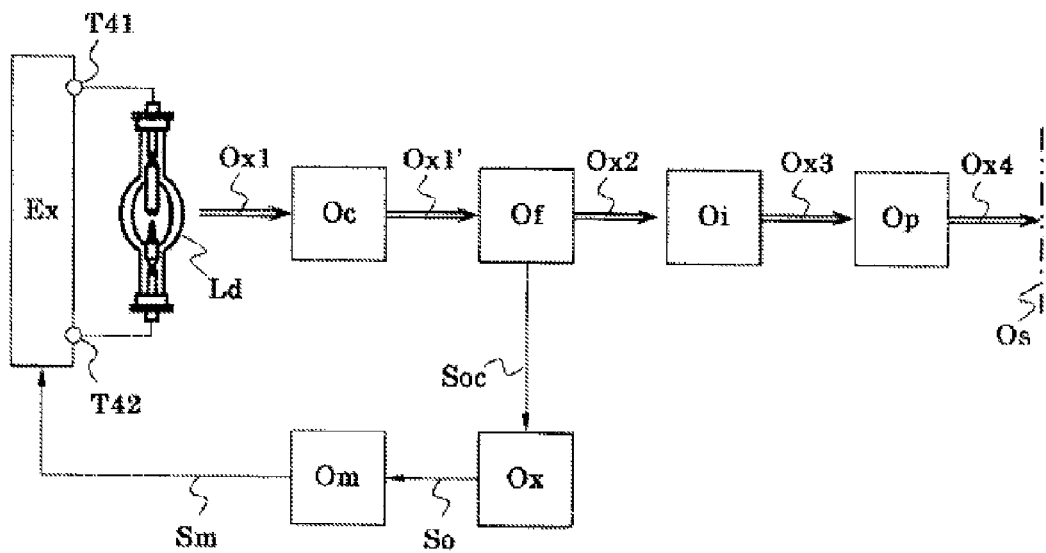
FIG. 3 is a schematic block diagram showing one form of a projector according to the present invention.

FIG. 3 is a schematic block diagrams showing a form of a projector according to the present invention. Light flux (Ox1) emitted from the discharge lamp (Ld) which is started and lighted by the discharge lamp lighting apparatus (Ex) according to the present invention, is converted into color sequential light flux (Ox2), by a dynamic color filter (Of) such as a rotation color wheel through light flux (Ox1') which passes through a capacitor optical system (Oc) which is provided if needed, and which includes a concave mirror, a condensing lens, etc. The color sequential light flux (Ox2) is modulated into color sequential image light flux (Ox3) by a spatial modulation element (Oi) which uses a DMD™, a LCD, a LCOS (reflection type liquid crystal display panel), etc. so that a projection image is formed by a projection lens (Op) on a screen (Os), which is integrally formed with the projector or formed outside the projector.

An image processing unit (Ox) of the projector generates a modulation switching timing signal (So) based on a signal (Soc) from a sensor, which corresponds to the color information appearing on the dynamic color filter (Of), such as a rotary encoder, and a modulation signal generating section (Om) generates a modulation signal (Sm) based on this, transmits it to the discharge lamp lighting apparatus (Ex), so that the light source intensity modulation according to the output current modulation may be performed. Since the discharge lamp (Ld) is lighted by the discharge lamp lighting apparatus (Ex) according to the present invention, it is possible to offer a projector in which even when the xenon discharge lamp, which is designed so that the temperature of a cathode electrode may become low, is lighted, it is possible to avoid the electric discharge instability, which tends to occur when a lighting operation, in which the intense output current modulation for light source intensity modulation continues, is performed, and right after that, the output current modulation is eased.

Figure 4:
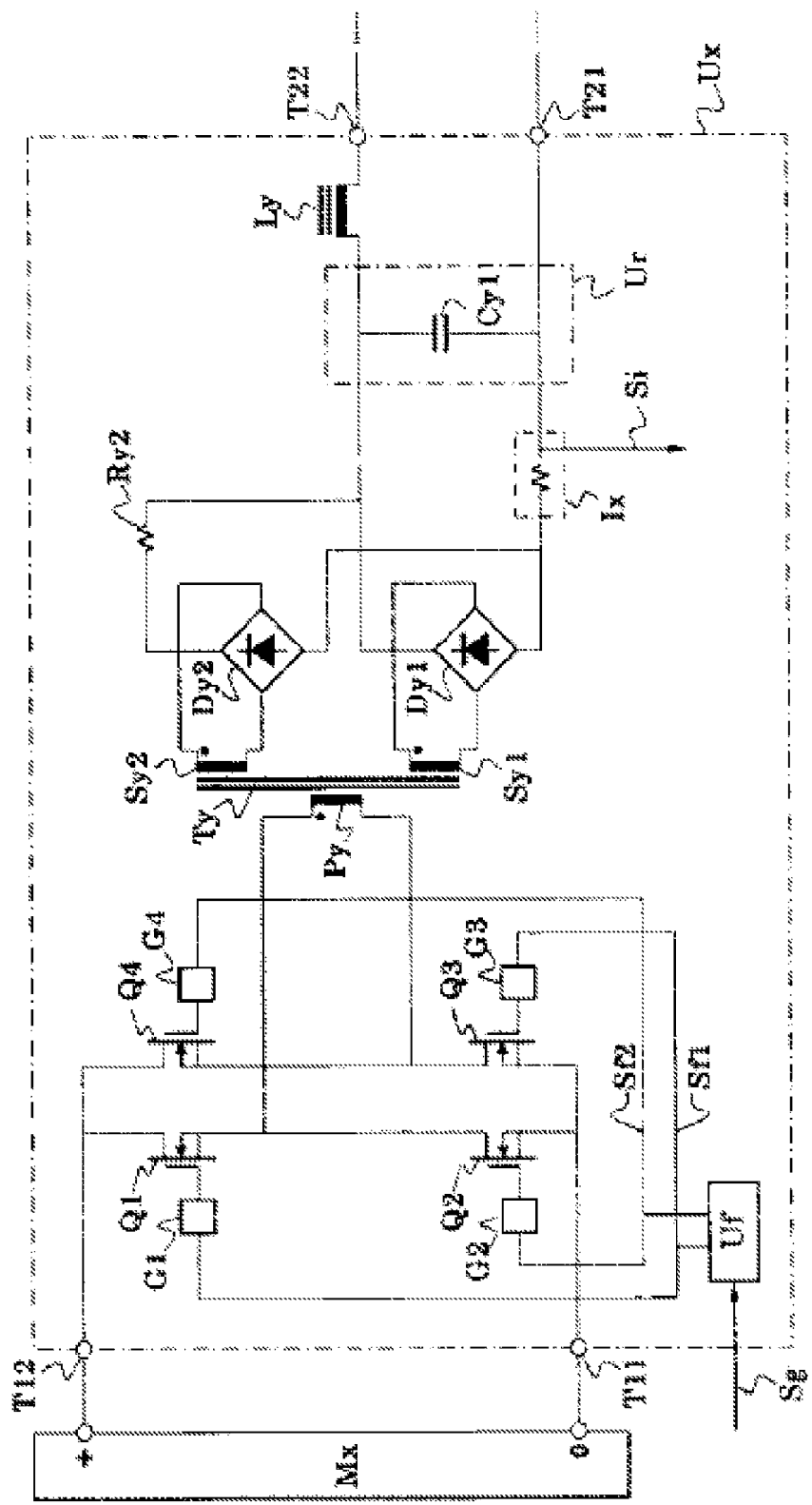
FIG. 4 is a schematic block diagram showing one form of part of a discharge lamp lighting apparatus according to the present invention.

Description of the configuration of an embodiment of the present invention will be given in detail below referring to drawings. First, description of a discharge lamp lighting apparatus formed by circuits shown in FIGS. 4, 5, 6, 7 and 8 will be given below. FIG. 4 is a schematic diagram showing an example of the structure of the power supply circuit (Ux). The power supply circuit (Ux) is operated by receiving voltage supply from a DC power source (Mx) formed by using the so-called PFC etc. including an active filter for rectifying commercial power and reducing harmonic current, and adjusts the amount of electric supply to the discharge lamp (Ld). Although in the power supply circuit (Ux), a converter, which drives a primary side winding (Py) of a transformer (Ty) by an inverter of a full bridge system, is shown as an example in this figure, it may be configured by other circuits, for example, a forward converter, a step down chopper etc, that is, the type of converter is not essential.

The inverter is configured by a full bridged circuit which uses switching elements (Q1, Q2, Q3, Q4) such as FETs. Each switching element (Q1, Q2, Q3, and Q4) is driven by a gate driving circuit (G1, G2, G3, and G4), and the gate driving circuit (G1, G2, G3, and G4) is controlled according to an inverter control signal (Sf1, Sf2) generated by the inverter control circuit (Uf) by receiving the gate driving signal (Sg) so that when the switching element (Q1) and the switching element (Q3) which are in diagonal element relationship are in an ON state, the switching element (Q2) and the switching element (Q4), which are in diagonal element relationship, are maintained in an OFF state, and conversely, when the switching element (Q2) and the switching element (Q4), which are in diagonal element relationship, are in an ON state, the switching element (Q1) and the switching element (Q3), which are in diagonal element relationship, are in an OFF state. When the two phases are switched, a period which is called a dead time in which all the switching elements (Q1, Q2, Q3, and Q4) are turned off, is inserted. As the ratio of time length excluding the dead time to time length of one cycle of a full bridge inverter operation, that is, a duty cycle ratio, becomes large, power transmission from the primary side to the secondary side of the transformer (Ty) increases.

In addition, in the case where the switching elements (Q1, Q2, Q3, and Q4) are MOSFETs, a parasitism diode whose forward direction is from a source terminal toward a drain terminal is built in each element itself (not shown), but an element such as a bipolar transistor etc. in which a parasitism diode does not exist, is used therefor, since there is a possibility that the element may be damaged by generation of reverse voltage at the above-mentioned switching time or during the dead time, when induced current resulting from the inductance component which exists in the downstream side of the inverter (Ui) will flow, it is desirable to connect a diode equivalent to a parasitism diode in reverse-parallel.

The output of the main secondary side coil (Sy1) of the transformer (Ty) is rectified by a diode bridge (Dy1), a ripple is reduced by a smoothing capacitor (Cy1) and a choke coil (Ly), and then arc discharge current is supplied to a discharge lamp (Ld) through nodes (T21, T22). On the other hand, by setting an auxiliary secondary side coil (Sy2) of the transformer (Ty) so that the number of turns thereof may be greater than the main secondary side coil (Sy1), comparatively high voltage for impressing release voltage in a no-load state to the discharge lamp (Ld) is outputted before starting, and the smoothing capacitor (Cy1) is charged through a diode bridge (Dy2) and a resistor (Ry2). When the starter (Us) is operated and the discharge lamp (Ld) is started so that arc discharge current begins to flow, the auxiliary secondary side coil (Sy2) cannot pass significant current since the resistor (Ry2) exists, so that it stops until it is started next time.

In addition, FIG. 1 shows the lamp current detection unit (Ix) for generating the lamp current detection signal (Si) so as to be provided outside the power supply circuit (Ux). However, when the lamp voltage drops rapidly at a time of shift to arc discharge of the discharge lamp (Ld), if the lamp current detection unit (Ix) is installed in a path through which large inrush current supplied by electric discharge from the smoothing capacitor (Cy1) flows, it appears in the lamp current detection signal (Si), whereby the power supply capacity control circuit (Ud) provided in a downstream side performs a feedback operation in response thereto so as to suppress the lamp current, so that there is a possibility that electric discharge may be induced to go out when the inrush current stops flowing. Therefore, in a practical circuit, as shown in FIG. 4, it is desirable that the lamp current detection unit (Ix) is not provided on a path into which an inrush current flows. Incidentally, the choke coil (Ly) has a function for preventing a light-out of the lamp because when going out of electric discharge occurs or begins to occur whereby the lamp current stops flowing or decreases, high voltage is generated by an induction action.

Figure 5:
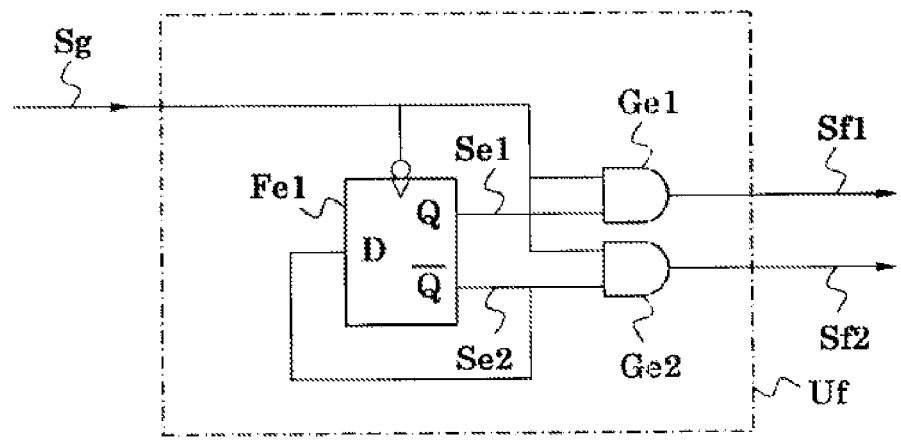
FIG. 5 is a schematic block diagram showing one form of part of a discharge lamp lighting apparatus according to an embodiment of the present invention.

FIG. 5 shows a schematic diagram of an example of the structure of the inverter control circuit (Uf). The gate driving signal (Sg) sent from the power supply capacity control circuit (Ud) is inputted into a clock signal input terminal of a D flip-flop (Fe1), and an output signal (Se1) thereof and a logic reversal output signal (Se2) thereof are reversed every falling edge of the gate driving signal (Sg). The output signals (Se1, Se2) are inputted into a logical AND gate (Ge1, Ge2) with the gate driving signal (Sg), respectively, so that the inverter control signals (Sf1, Sf2) for driving the full bridge inverter are generated according to the duty cycle ratio of the gate driving signal (Sg).

Figure 6:
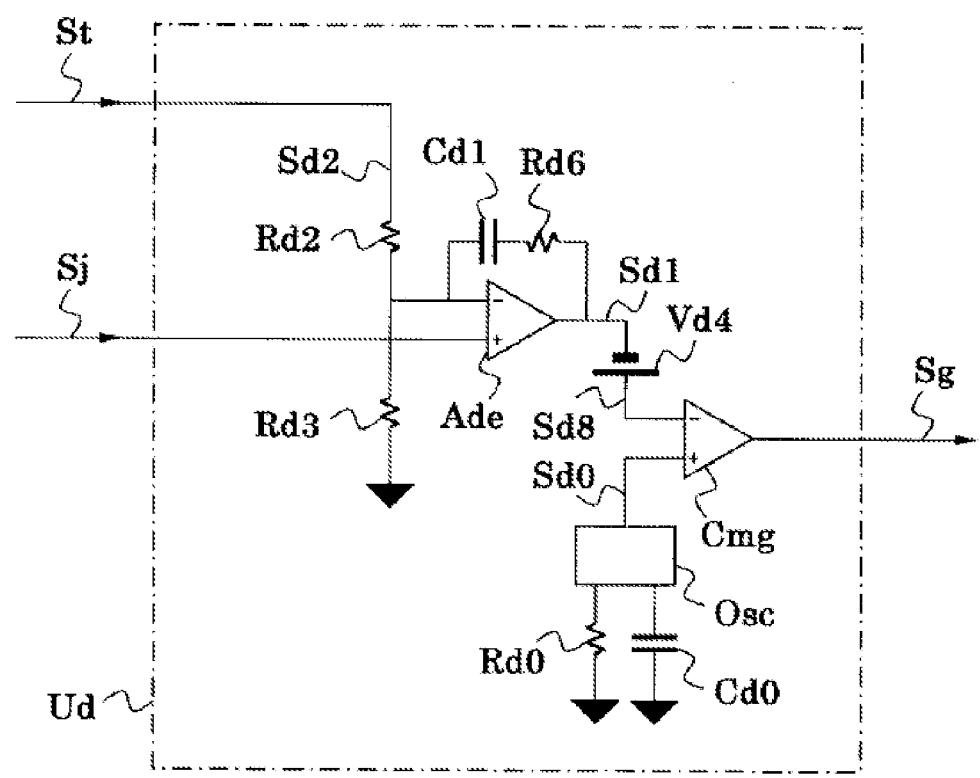
FIG. 6 is a schematic block diagram showing one form of part of a discharge lamp lighting apparatus according to an embodiment of the present invention.

FIG. 6 is a schematic diagram showing an example of the structure of the power supply capacity control circuit (Ud). The lamp current target signal (St) is divided in voltage by a resistor (Rd2) and a resistor (Rd3) so as to form a converter drive target signal (Sd2), and it is inputted into an inverting input terminal of an operational amplifier (Ade). On the other hand, the lamp current correlation signal (Sj) is inputted into a non-inverting input terminal of the operational amplifier (Ade). And since the output signal (Sd1) of the operational amplifier (Ade) is fed back to the inverting input terminal through an integration capacitor (Cd1) and a speedup resistor (Rd6), the operational amplifier (Ade) serves as an error integration circuit, which integrates a difference between the voltage of the converter drive target signal (Sd2) divided by the resistor (Rd2) and the resistor (Rd3) and the voltage of the lamp current correlation signal (Sj).

Figure 9:
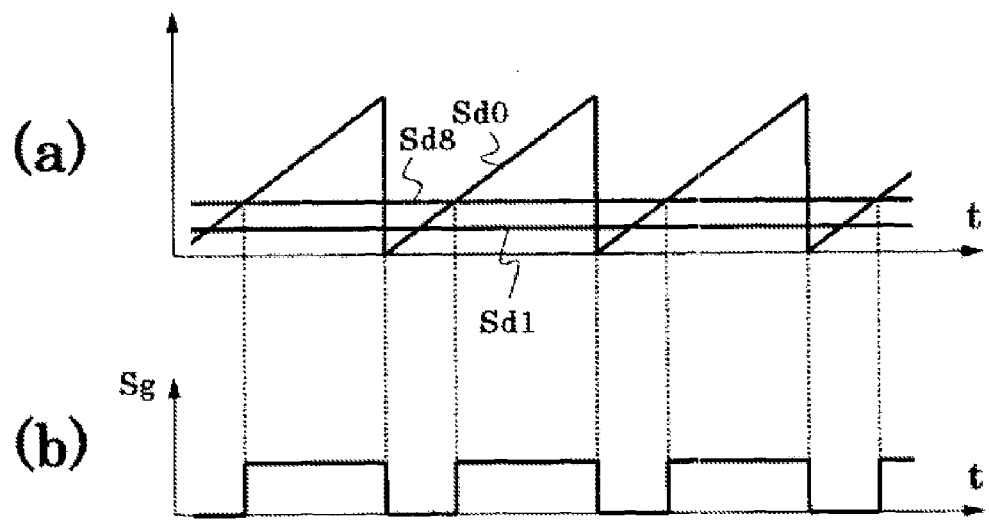
FIG. 9 is a timing chart showing one form of an operation of a discharge lamp lighting apparatus according to an embodiment of the present invention.

An oscillator (Osc), to which a capacitor (Cd0) and a resistor (Rd0) for deciding a time constant are connected, generates a sawtooth waveform signal (Sd0) as shown in FIG. 9, and this sawtooth waveform signal (Sd0) and the output signal (Sd1) of the error integration circuit are compared with each other by a comparator (Cmg). However, in the comparison, the signal (Sd8) which is obtained by adding offset voltage (Vd4) to the output signal (Sd1) of the error integration circuit and the sawtooth waveform signal (Sd0) are compared with each other. The gate driving signal (Sg), which becomes high level in a period when the voltage of the sawtooth waveform signal (Sd0) is higher than the voltage of the (Sd8) is generated, and outputted from the power supply capacity control circuit (Ud).

As described above, in order that the signal (Sd8) is obtained by adding an offset to the output signal (Sd1) of the error integration circuit, even if the output signal (Sd1) of the error integration circuit is zero, the duty cycle ratio of the gate driving signal (Sg) becomes a certain maximum value, which is smaller than 100%, that is, the maximum duty cycle ratio, or less. FIGS. 9A and 9B show relations between the output signal of the error integration circuit (Sd1), the signal (Sd8) which is obtained by adding an offset thereto, the sawtooth waveform signal (Sd0) and the gate driving signal (Sg).

The gate driving signal (Sg) outputted from the power supply capacity control circuit (Ud) is inputted into the inverter control circuit (Uf), whereby a feedback control system, in which the lamp current correlation signal (Sj) is fed back to an operation of the full bridge inverter, is formed.

Figure 7:
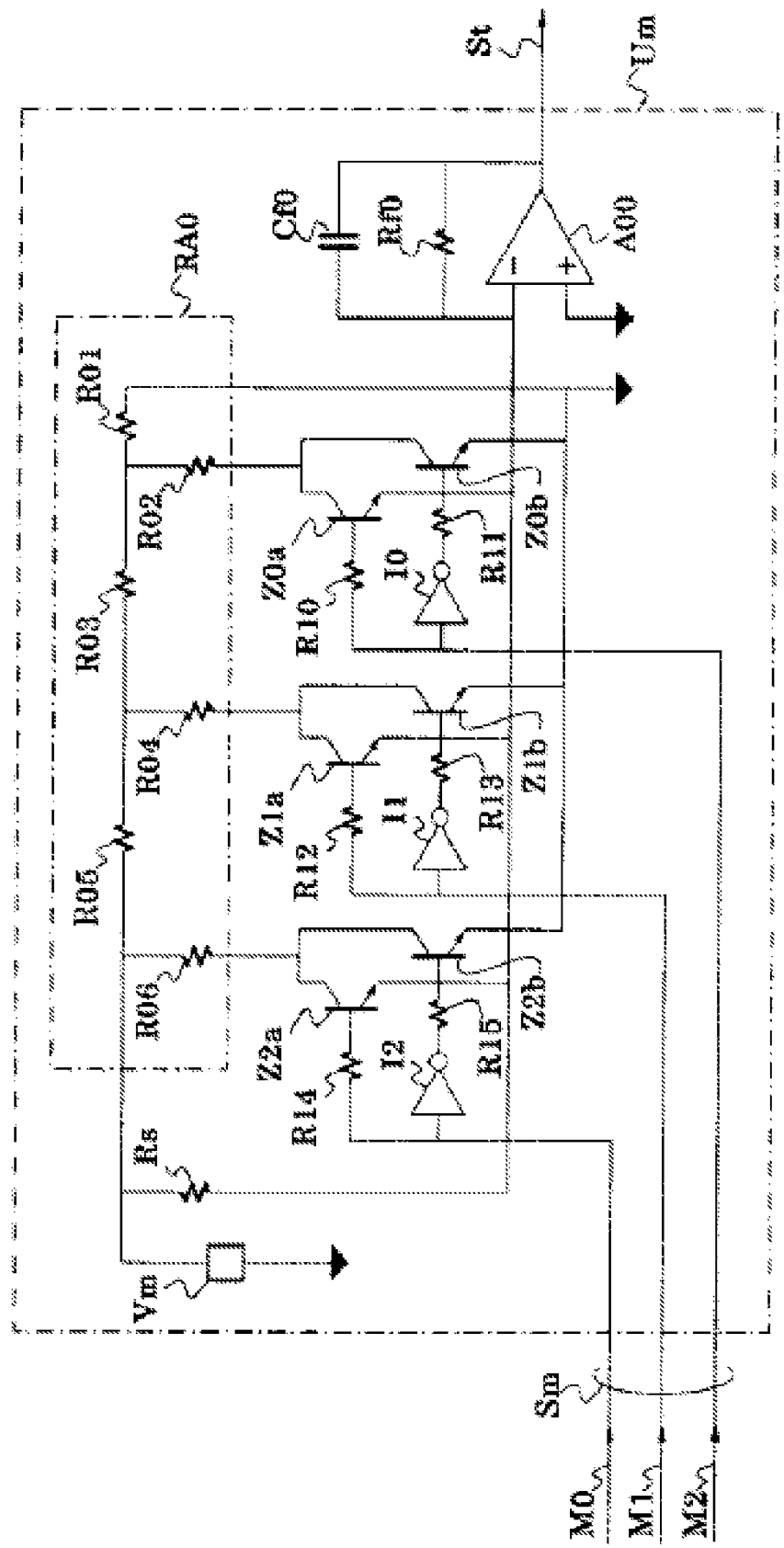
FIG. 7 is a schematic block diagram showing one form of part of a discharge lamp lighting apparatus according to an embodiment of the present invention.

FIG. 7 is a schematic diagram showing an example of the structure of the output current modulation circuit (Um). An output of the voltage source (Vm), which is a suitable voltage, is connected to an inverting input terminal of an operational amplifier (A00) through a resistor (Rs). Since the lamp current target signal (St), which is an output of the operational amplifier (A00), is fed back to the inverting input terminal, through a resistor (Rf0) and a capacitor (Cf0), which are connected in parallel thereto, the operational amplifier (A00) generates the lamp current target signal (St) which has a component proportional to the voltage of the voltage source (Vm), depending on the resistance of the resistor (Rs).

This figure shows case where the modulation signal (Sm) is made up of 3-bit modulation data (M0, M1, M2). While an ON and OFF state of each of switching elements (Z0a, Z1a, Z2a) is controlled corresponding to truth and false of each bit of the modulation data (M0, M1, M2), inverters (I0, I1, I2) are inserted in the respective bases of the switching elements (Z0b, Z1b, Z2b), wherein one of the switching element (Z0a) and the switching element (Z0b) is an On state when the other is in an OFF state, one of the switching element (Z1a) and the switching element (Z1b) is an On state when the other is in an OFF state, and one of the switching element (Z2a) and the switching element (Z2b) is an On state when the other is in an OFF state.

The switching elements (Z0a, Z0b), the switching elements (Z1a, Z1b), and the switching elements (Z2a, Z2b) are respectively connected to the resistor (R02), a resistor (R04), and a resistor (R06) of a ladder resistor network (RAO) which consists of the resistors (R01, R02, R03, R04, R05, R06), wherein the current which flows through the switching element (Z0a, Z1a, Z2a) is connected to the inverting input terminal of the operational amplifier (A00). As taught in the theory of DA conversion, the lamp current target signal (St), which has a component proportional to the voltage of the voltage source (Vm), is generated depending on a digital value of the modulation data (M0, M1, M2). However, all the resistances of resistors (R01, R02, R04, R06) are the same as one another, and the resistance of the resistors (R03, R05) is set to a half of this resistance. In addition, although the case of three bits is shown as an example here, the number of bits is increased or decreased if needed in a configuration similar to the above. Of course, the circuit described here can be configured by using an IC for DA conversion.

By the above structure, the lamp current target signal (St) is generated by superimposing a value depending on the digital value of the modulation data (M0, M1, M2), on a basic value depending on the resistance of the resistor (Rs). However, the modulation data (M0) serves as a least significant bit, and the modulation data (M2) serve as the most significant bit. A ratio of a difference between the value of the lamp current target signal (St) at time of the maximum modulation and that at time of the minimum modulation, to the degree of modulation, that is, a value of the lamp current target signal (St) at time of the maximum modulation, can be set by the resistance of the resistor (Rs). Moreover, a value of the lamp current target signal (St) at the time of the maximum modulation can be set by output voltage of the voltage source (Vm).

And, with respect to the speed of response of the output current modulation circuit (Um) shown in FIG. 7, by increasing the digital value of the modulation data (M0, M1, M2), the value of electric capacity of the capacitor (Cf0) can be set and the speed of change of the lamp current target signal (St) can be limited and outputted so that the speed of change may become 2.6 A or less per millisecond and/or the undershoot (Pun) may not occur in the lamp voltage (VL) in the case where the magnitude of the lamp current per square millimeter in a cross sectional area of the cathode electrode (E1) decreases; and so that the speed of change becomes 3.0 A or less per millisecond, and/or the overshooting (Pov) may not occur in the lamp voltage (VL) in case where the magnitude of the lamp current per square millimeter in a cross sectional area of the cathode electrode (E1) increases, wherein the speed of change becomes slower, as the electric capacity thereof is larger.

Alternatively, in order to realize the limitation and output of the speed of change of the lamp current target signal (St), instead of making slow the speed of response of the output current modulation circuit (Um), the modulation signal (Sm) itself may be generated as a signal whose change speed is limited, and may be inputted into the output current modulation circuit (Um). Since the modulation signal (Sm) is multi-bit digital numerical data, when the modulation data (M0, M1, M2) is increased, for example, it may be increased by 1 LSB every suitable time interval, instead of directly increasing a certain value to another value.

Although, as described above, in this embodiment, the modulation signal (Sm), which is multi-bit digital numerical data, is inputted into the output current modulation circuit (Um) in parallel as the modulation data (M0, M1, M2), it may be inputted by serial communication. Furthermore, for example, it is possible to configure the structure so that the modulation signal (Sm) may be inputted in the form of numerical information expressed by character code of ASCII etc., for example, as a command which passes through the general-purpose universal asynchronous receiver-transmitter (UART) etc.

Figure 8:
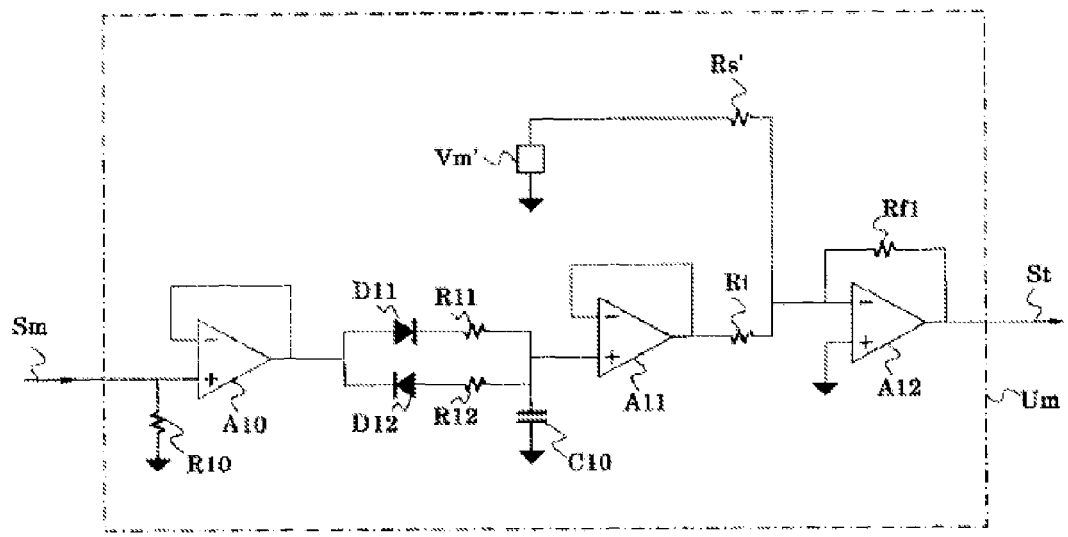
FIG. 8 is a schematic block diagram showing one form of part of a discharge lamp lighting apparatus according to an embodiment of the present invention.

FIG. 8 is a schematic block diagram showing the output current modulation circuit (Um) according to an embodiment of the present invention. In this figure, a modulation signal (Sm) is an analog signal, and the output current modulation circuit (Um) performs a modulation so as to raise the lamp current target signal (St) by the amount correlated with the magnitude of the modulation signal (Sm). The modulation signal (Sm) is received by an impedance matching resistor (R10) provided if needed, and a non-inverting buffer formed by an operational amplifier (A10) provided if needed. The modulation signal (Sm) which passed through the operational amplifier (A10), flows into a capacitor (C10) through a parallel circuit consisting of a series circuit of a diode (D11) and a resistor (R11), and a series circuit of resistor (R12) and a diode (D12) whose direction is opposite to that of the diode (D11).

By such a configuration, voltage, which appears at the capacitor (C10), is observed as a signal, which is obtained by specifying and changing the rising speed and the descending speed individually by the resistor (R11) and the resistor (R12). This signal is passed through a non-inverting buffer formed by the operational amplifier (A11) provided if needed, and is connected to an inverting input terminal of an operational amplifier (A12) through a resistor (Rt). Moreover, an output of the voltage source (Vm'), which exists like an offset even when the modulation signal (Sm) is zero and is provided in order to obtain a minimum value of the lamp current target signal (St), and which has suitable voltage is connected to an inverting input terminal of the operational amplifier (A12) through a resistor (Rs').

By such a structure, a sum of the voltage of the voltage source (Vm') and the voltage of the capacitor (C10) is calculated, so that a lamp current target signal (St) is generated as an output signal of the operational amplifier (A12). However, in the calculation of the sum of the voltage of the voltage source (Vm') and the voltage of the capacitor (C10), weight may be set up according to the values of the resistor (Rt) and the resistor (Rs'). Moreover, an inverting amplifier gain of the operational amplifier (A12) can be setup according to a value of the resistor (Rf1) for feedback.

As described above, by such a configuration, the output current modulation circuit (Um) shown in FIG. 8 can generate the lamp current target signal (St) as a signal which is obtained by individually specifying the rising speed and the descending speed of the modulation signal (Sm). Therefore, this output current modulation circuit (Um) can specify and output the speed of change of the lamp current target signal (St), so that the speed of change may become 2.6 A or less per millisecond or undershoot (Pun) may not occur in the lamp voltage (VL) in case where the magnitude of the lamp current per square millimeter in a cross sectional area of the cathode electrode (E1) decreases; and so that the speed of change becomes 3.0 A or less per millisecond, or overshoot (Pov) may not occur in a lamp voltage (VL) in case where the magnitude of the lamp current per square millimeter in a cross sectional area of the cathode electrode (E1) increases.

When the above-mentioned modulation signal (Sm) is a binary logic signal, and when, depending on truth and false of the modulation signal (Sm), the output current modulation circuit (Um) indicates whether or not the modulation is performed so that the lamp current target signal (St) is raised, the operational amplifier (A10) of the output current modulation circuit (Um) shown in FIG. 8 may be replaced with a comparator.

Since the speed of change of lamp current becomes slow even when the xenon discharge lamp, which is configured by the circuits shown in FIGS. 4, 5, 6, 7 and 8, and which is designed so that the temperature of a cathode electrode may become low, is lighted, formation of two or more fine protrusions can be prevented at time of electric discharge, in the inside or the circumference part of an arc spot at the tip of the cathode electrode (E1), so that it is possible to avoid the electric discharge instability, which tends to occur when a lighting operation, in which the intense output current modulation for light source intensity modulation continues, is performed, and after that, output current modulation is eased, whereby it is possible to offer a discharge lamp lighting apparatus capable of avoiding electric discharge instability.

Figure 10:
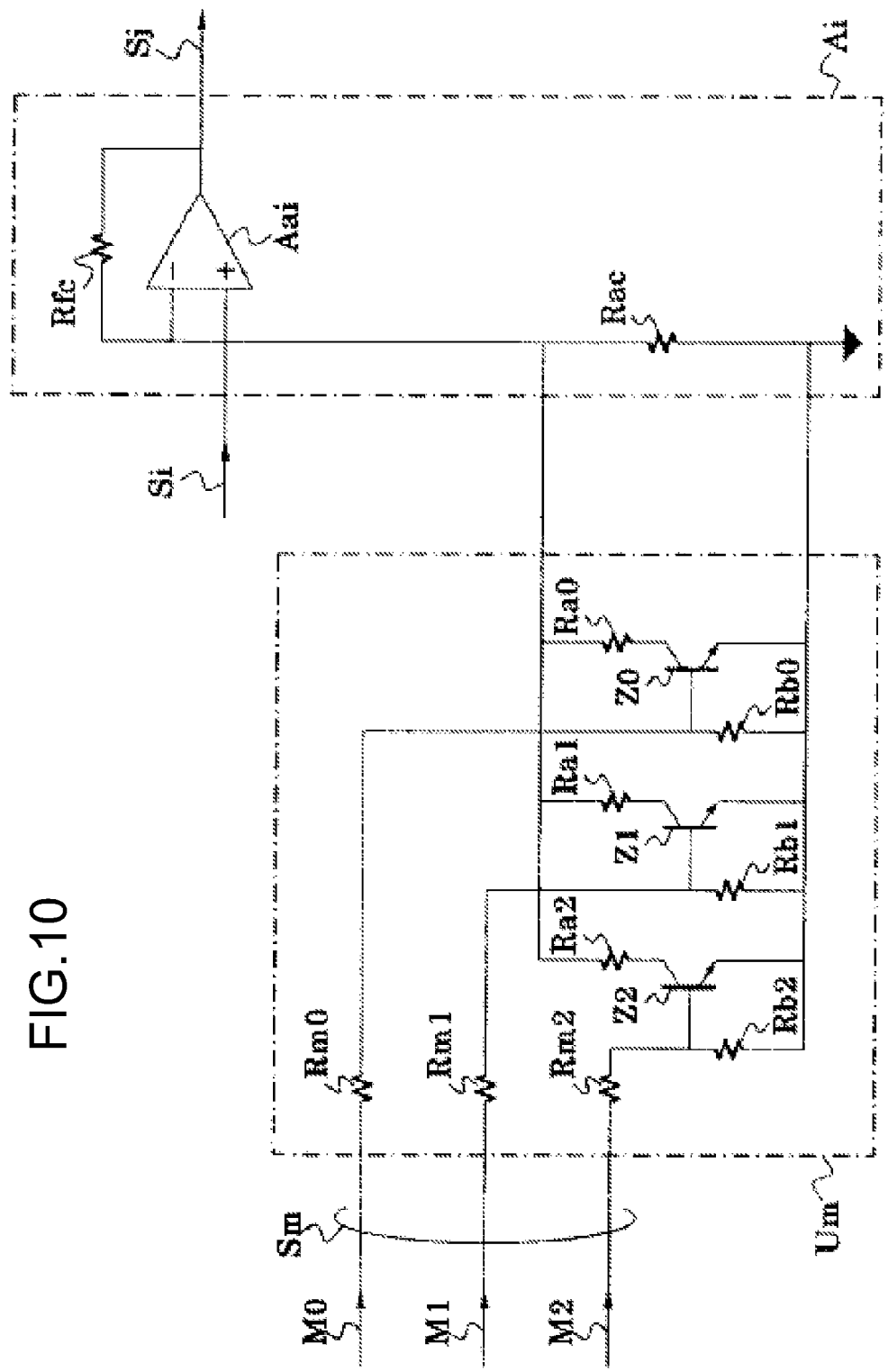
FIG. 10 is a schematic block diagram showing one form of part of a discharge lamp lighting apparatus according to an embodiment of the present invention.

The configuration, in which the output current modulation circuit (Um) may act on the lamp current detection signal converting circuit (Ai), is described above in connection with FIG. 2, as an example suitable for the discharge lamp lighting apparatus having a function of modulating the magnitude of lamp current according to the modulation signal (Sm) on the basis of constant power control of lamp power. FIG. 10 is a schematic diagram showing a concrete example of the structure of the output current modulation circuit (Um) and the lamp current detection signal converting circuit (Ai) for the above configuration. The lamp current detection signal converting circuit shown in this figure is based on a non-inverting amplifier formed by an operational amplifier (Aai), wherein the lamp current detection signal (Si), is amplified by the operational amplifier (Aai), and the lamp current correlation signal (Sj) is generated as an output signal thereof.

The output of the operational amplifier (Aai) is divided by a resistor (Rfc) and a combined resistance (resistor) formed by a resistor (Rac) and resistors which are in parallel connected thereto and the ground, and is connected to an inverting input terminal of the operational amplifier (Aai), so that the gain of this non-inverting amplifier is defined by the divided voltage ratio. Since transistor type switching elements (Z0, Z1, Z2) are inserted respectively between the resistors (Ra0, Ra1, Ra2) connected in parallel to the resistor (Rac), and the ground, a connection state and non-connection state of each resistor (Ra0, Ra1, Ra2) is switched by turning ON or OFF each switching element (Z0, Z1, Z2), so that it is possible to change the gain of this non-inverting amplifier.

Since a base terminal of each switching element (Z0, Z1, Z2) is connected to the modulation data (M0, M1, M2) through the base resistor (Rm0, Rm1, Rm2) respectively, an ON/OFF state of each switching element (Z0, Z1, Z2) is controlled corresponding to truth and false of each bit of the modulation data (M0, M1, M2), so that it is possible to change the gain of this non-inverting amplifier based on combinations of truth and false of each bit of the modulation data (M0, M1, M2).

Here, with respect to a relation of resistance of resistors (Ra0, Ra1, Ra2), the resistance of the resistor (Ra0) is set up twice that of the resistor (Ra1), and the resistance of the resistor (Ra1) is set up twice of that of the resistor (Ra2), it is possible to change the gain of this non-inverting amplifier based on 3-bit binary number data wherein the modulation data (M0) serves as a least significant bit and the modulation data (M2) serves as the most significant bit. However, the gain of a non-inverting amplifier and the binary number data are not in a straight line relation.

In addition, although the case of three bits is described as an example, the number of bits may be changed if needed in a configuration similar to the above.

Of course, the discharge lamp lighting apparatus, which is based on the constant electric power control of lamp electric power, and which has a function of modulating the magnitude of the lamp current according to the modulating signal (Sm), may be realized by other structures in addition to the above-described structure shown in FIG. 2, which uses the circuit shown in FIG. 10. For example, this can be realized, based on the structure shown in FIG. 1, which uses the circuit shown in FIG. 7. Specifically, as described above, the voltage source (Vm) can be configured so that a lamp current target value, which is obtained by dividing a predetermined lamp power target value by a value of the lamp voltage detection signal (Sv) from the lamp voltage detection unit (Vx), may be converted from digital to analog, and this may be outputted as voltage of the voltage generator (Vm) shown in FIG. 7.

Although application of the present invention to a projector is mainly explained in the above embodiments in the present specification, if the discharge lamp lighting apparatus according to the present invention which lights a xenon discharge lamp is used, it can be applied to any type of uses and the effects thereof can be acquired well.

A circuit configuration given in the specification is described at a minimum in order to explain the operations, functions and actions of the light source apparatus according to the present invention. Details of the above described circuit configurations or actions may be changed without departing from the scope of the invention, for example, determinations of the polarity of signals, or substitutions, additions, or omissions of concrete circuit elements may be carried out without departing from the scope of the invention.

The exemplary illustrations described above may also be modified by providing mechanisms for protecting circuit elements, such as switching elements such as FETs etc. of a power supply apparatus from breakage factors, for example, an overvoltage, overcurrent or overheating, or by providing mechanisms for reducing a radiation noise or a conduction noise, generated due to an operation of the circuit element of the power supply apparatus or for preventing the generated noise from releasing to the outside, for example, a snubber circuit, and a varistor, a clamp diode, a current restriction circuit (including a pulse by pulse system), a noise filter choke coil of a common mode, or normal mode, a noise filter capacitor, etc. The structure of the discharge lamp lighting apparatus according to the present invention is not limited to the circuits described in this specification or waveform and timing chart shown in the figures.

The structure of the control circuit formed by digital or digital and analog signal processing circuits shown in, for example, FIG. 5 or 6 as an example in the specification, may be realized so that an expected function may be achieved by converting an inputted analog signal into a digital signal by AD conversion in an input stage, and outputting, based on digital data generated by digital computation in a microprocessor or converting into an analog signal by a DA conversion if necessary and outputting it.

When such a processing function is realized by using a dedicated IC, which is generally called a DSP (digital signal processor), it is especially suitable as a configuration method of the control circuit of the present invention.

The present invention can be used in the field where a discharge lamp lighting apparatus for lighting a short arc high intensity discharge lamp, that is the so-called xenon discharge lamp, which has an electric discharge medium whose main component is xenon and which is used in an optical apparatus, such as a projector, is designed or manufactured.

The preceding description has been presented only to illustrate and describe exemplary embodiments of the present discharge lamp lighting apparatus and projector. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus for lighting a discharge lamp in which an electric discharge medium, which contains xenon, is enclosed in an electric discharge container, and a cathode electrode and anode electrode for main discharge are arranged to face each other, the discharge lamp lighting apparatus comprising:
 a starter that generates a high voltage at start-up time to produce dielectric breakdown in the electric discharge container of the discharge lamp, and
 a power supply circuit that supplies discharge current to the discharge lamp,
 wherein the power supply circuit comprises an output current modulation circuit that is controllable by a modulation signal to modulate a magnitude of the discharge current by superimposing a rectangle pulsed current onto the discharge current, the discharge current continuously passes through the discharge lamp in at least a lighting steady state,
 wherein the output current modulation circuit is configured to control a speed at which a magnitude of the discharge current per square millimeter in a cross section of the cathode electrode decreases by an amount not greater than 3.0 A per millisecond.

2. The discharge lamp lighting apparatus according to claim 1, wherein the output current modulation circuit limits the speed at which the magnitude of the discharge current per square millimeter in a cross section of the cathode electrode decreases to a speed at which undershoot of lamp voltage does not occur.

3. The discharge lamp lighting apparatus according to claim 1, wherein the output current modulation circuit controls the speed at which the magnitude of the discharge current per square millimeter in a cross section of the cathode electrode increases so as to be 2.6 A per millisecond or less.

4. The discharge lamp lighting apparatus according to claim 1, wherein the output current modulation circuit limits the speed at which the magnitude of the discharge current per square millimeter in a cross section of the cathode electrode increases to a speed at which overshoot of the lamp voltage does not occur.

5. The discharge lamp lighting apparatus according to claim 2, wherein the output current modulation circuit controls the speed at which the magnitude of the discharge current per square millimeter in a cross section of the cathode electrode increases so as to be 2.6 A per millisecond or less.

6. The discharge lamp lighting apparatus according to claim 2, wherein the output current modulation circuit limits the speed at which the magnitude of the discharge current per square millimeter in a cross section of the cathode electrode increases to a speed at which overshoot of the lamp voltage does not occur.

7. The discharge lamp lighting apparatus according to claim 3, wherein the output current modulation circuit limits the speed at which the magnitude of the discharge current per square millimeter in a cross section of the cathode electrode increases to a speed at which overshoot of the lamp voltage does not occur.

8. A projector comprising the discharge lamp lighting apparatus of claim 1, which starts and lights the discharge lamp, wherein light flux generated by the discharge lamp is changed into color sequential light flux by a dynamic colored filter, whereby an image is displayed by projection using the color sequential light flux.

9. A method of lighting a discharge lamp in which an electric discharge medium, which contains xenon, is enclosed in an electric discharge container, and a cathode electrode and anode electrode for main discharge are arranged to face each other, the method comprising:
 supplying a discharge current to the discharge lamp,
 applying a modulation signal to modulate a magnitude of the discharge current by superimposing a rectangle pulsed current onto the discharge current, the discharge current continuously passes through the discharge lamp in at least a lighting steady state, and
 controlling a speed at which a magnitude of the discharge current per square millimeter in a cross section of the cathode electrode decreases by an amount not greater than 3.0 A per millisecond.

10. The method of claim 9, further comprising limiting the speed at which the magnitude of the discharge current per square millimeter in a cross section of the cathode electrode decreases to a speed at which undershoot of lamp voltage does not occur.

11. The method of claim 9, further comprising controlling the speed at which the magnitude of the discharge current per square millimeter in a cross section of the cathode electrode (E1) increases so as to be 2.6 A per millisecond or less.

12. The method of claim 9, further comprising limiting the speed at which the magnitude of the discharge current per square millimeter in a cross section of the cathode electrode increases to a speed at which overshoot of the lamp voltage does not occur.

13. A method of lighting a discharge lamp according to claim 1, the method comprising:
 supplying a discharge current to the discharge lamp,
 modulating the magnitude of the discharge current passed through the discharge lamp in at least a lighting steady state, according to a modulation signal, and
 controlling a speed at which the magnitude of the discharge current per square millimeter in a cross section of the cathode electrode decreases so as to be 3.0 A or less per millisecond.

14. The method of claim 13, further comprising limiting the speed at which the magnitude of the discharge current per square millimeter in a cross section of the cathode electrode decreases to a speed at which undershoot of lamp voltage does not occur.

15. The method of claim 13, further comprising controlling the speed at which the magnitude of the discharge current per square millimeter in a cross section of the cathode electrode increases so as to be 2.6 A per millisecond or less.

16. The method of claim 13, further comprising limiting the speed at which the magnitude of the discharge current per square millimeter in a cross section of the cathode electrode increases to a speed at which overshoot of the lamp voltage does not occur.

17. The method of claim 13, wherein the magnitude of the discharge current per square millimeter in a cross section of the cathode decreases by an amount not greater than 1.6 A per millisecond.

18. The discharge lamp lighting apparatus according to claim 1, wherein the magnitude of the discharge current per square millimeter in a cross section of the cathode electrode decreases by an amount not greater than 1.6 A per millisecond.

19. The method of claim 9, wherein the magnitude of the discharge current per square millimeter in a cross section of the cathode decreases by an amount not greater than 1.6 A per millisecond.

\* \* \* \* \*